United States Patent Office 3,795,685
Patented Mar. 5, 1974

---

3,795,685
PROCESS FOR PREPARING N-ALKYL-DIMETHYLAMINES
Enrico Sianesi, Milan, Italy, assignor to Recordati SA Chemical and Pharmaceutical Company, Lugano, Switzerland
No Drawing. Filed July 15, 1971, Ser. No. 163,048
Claims priority, application Italy, Oct. 19, 1970, 31,155/70
Int. Cl. C07d 7/24
U.S. Cl. 260—345.2       3 Claims

ABSTRACT OF THE DISCLOSURE

N-alkyl- and N-(substituted alkyl)-dimethylamines are prepared by reacting an unsubstituted or substituted alkyl halide with dimethylamine in an aqueous medium free from organic solvent and at a temperature not higher than about 30° C.

---

It is known that N-alkyl-dimethylamines, non-substituted or substituted on the alkyl group, can be prepared by reacting an alkyl or substituted alkyl halide with dimethylamine. According to the conventional technique, this reaction is carried out in an organic solvent, usually ethanol, with heating and possibly with pressure. However, the yields of the desired product are not always satisfactory.

For instance, 3-methyl-7-methoxy-8-dimethylaminomethyl-flavone, which is a compound known for its pharmacological activity, has already been prepared by reacting 3-methyl-7-methoxy-8-chloromethyl-flavone with dimethylamine, according to the known technique mentioned above, but the yields did not exceed about 55% of the theoretical (see particularly: Swiss Patent No. 373,765, U.S. Pat. No. 3,147,258, and the German Pat. No. 1,182,669).

We have now found that the yields of this conventional reaction may be greatly improved if it is carried out under specified conditions.

Thus the object of this invention is a process for preparing N-alkyl-dimethylamines and N-(substituted alkyl)-dimethylamines, wherein an unsubstituted or substituted alkyl halide is reacted with dimethylamine. This process is characterized in that the reaction is carried out in an aqueous medium free from organic solvent, and at a temperature not substantially higher than 30° C.

The invention includes the application of the above-defined process to the preparation of 3-methyl-7-methoxy-8-dimethylaminomethyl-flavone, by reacting 3-methyl-7-methoxy-8-chloromethyl-flavone with dimethylamine.

For carrying out the process in accordance with the invention, preferably an excess of an aqueous commercial solution containing approximately 30% of dimethylamine is used, and the reaction is continued for a period of 8 days (a shorter time lowers the yield) with occasional stirring.

With a dimethylamine solution which is substantially more diluted, no reaction is obtained, or only minimal yields. The amount of dimethylamine, as well as its concentration, is important; below a limiting value, which is twice the stoichiometric amount, the yields decrease.

EXAMPLE

Preparation of 3-methyl-7-methoxy-8-dimethylaminomethyl-flavone

30–45 ml. of aqueous dimethylamine (approximately 30% commercial solution) are added to 15.73 g. of 3-methyl-7-methoxy - 8 - chloromethyl-flavone. The semi-solid mass is stirred, and then left at room temperature (not higher than 30°) for 8 days in a well closed vessel with occasional stirring.

The mass is then diluted with 100 ml. of water, it is filtered through a Büchner funnel, and washed with water. The solid is slurry into another 100 ml. of water, the slurry is made acidic with concentrated hydrochloric acid, and after it has settled, the insoluble portion is removed by filtration. The filtrate is washed with benzene, the aqueous phase is separated and filtered to obtain a clear solution, and the base is very slowly precipitated by carefully adding a cold saturated solution of $Na_2CO_3$ with frequent stirring. After leaving it overnight, the solid is collected by filtration through a Büchner funnel, it is washed with water and vacuum-dried and then dried over silica gel. 14.10 g. of product are obtained. Yield: 87.8% of the theoretical. Melting point: 108.5–109.5°. Acid value: 100.3%. Thin layer chromatography: unitary.

The tertiary base thus obtained may be transformed into a salt, for instance a hydrochloride, according to known methods.

What is claimed is:

1. A process for preparing a benzopyrone having a dimethylaminomethyl group on the benzene ring which comprises suspending a halogenomethylbenzopyrone in an aqueous solution containing dimethylamine at a temperature not substantially greater than 30° C., said aqueous medium containing at least twice the stoichiometric requirements of dimethylamine and being substantially free from any organic solvent, maintaining the resulting suspension within the said temperature range until reaction between the suspended halogenomethylbenzopyrone and dimethylamine to form a dimethylaminomethylbenzopyrone and thereafter separating the solid product from the aqueous phase.

2. A process according to claim 1, characterized in that the initial concentration of dimethylamine in the aqueous medium is at least 30% by weight.

3. The process of claim 1 wherein the halogenomethylbenzopyrone is 2-phenyl-3-methyl-7-methoxy-8-chloromethyl-γ-benzopyrone and the product is 2-phenyl-3-methyl-7-methoxy - 8 - dimethylaminomethyl-γ-benzopyrone.

References Cited

UNITED STATES PATENTS 3,410,851   11/1966   Stauffer _____ 260—345.2 X

JOHN M. FORD, Primary Examiner

U.S. Cl. X.R.

260—583 R